(12) United States Patent
Merrell

(10) Patent No.: US 12,404,198 B2
(45) Date of Patent: Sep. 2, 2025

(54) SYSTEMS, METHODS, AND APPARATUS FOR MECHANICALLY REMOVING LIQUID FROM MATERIAL

(71) Applicant: Merrell Bros., Inc., Kokomo, IN (US)

(72) Inventor: Terry Merrell, Kokomo, IN (US)

(73) Assignee: Merrell Bros., Inc., Kokomo, IN (US)

( * ) Notice: Subject to any disclaimer, the term of this patent is extended or adjusted under 35 U.S.C. 154(b) by 0 days.

(21) Appl. No.: 19/095,510

(22) Filed: Mar. 31, 2025

(65) Prior Publication Data

US 2025/0230085 A1 Jul. 17, 2025

Related U.S. Application Data

(63) Continuation of application No. 17/720,353, filed on Apr. 14, 2022, now Pat. No. 12,297,135.

(51) Int. Cl.
  *C02F 9/00* (2023.01)
  *B01D 43/00* (2006.01)
  (Continued)

(52) U.S. Cl.
  CPC .............. *C02F 9/00* (2013.01); *B01D 43/00* (2013.01); *C02F 1/008* (2013.01); *F26B 15/00* (2013.01);
  (Continued)

(58) Field of Classification Search
  CPC ........ F26B 2200/18; F26B 15/00; C02F 9/00; C02F 1/008; C02F 11/122; C02F 11/123; C02F 11/147; B01D 43/00
  See application file for complete search history.

(56) References Cited

U.S. PATENT DOCUMENTS

| | | | |
|---|---|---|---|
| 4,043,047 A | 8/1977 | Galliker | |
| 4,121,539 A | 10/1978 | Moore | |

(Continued)

FOREIGN PATENT DOCUMENTS

| | | |
|---|---|---|
| CN | 2727147 Y | 9/2005 |
| CN | 2752690 Y | 1/2006 |

(Continued)

OTHER PUBLICATIONS

Bennamoun, L., "Solar drying of wastewater sludge: A review." Renewable and Sustainable Energy Reviews; 2012; pp. 1061-1073; vol. 16; Elsevier Ltd., Algeria (13 pages).

(Continued)

*Primary Examiner* — Thuan D Dang
(74) *Attorney, Agent, or Firm* — FisherBroyles, LLP

(57) ABSTRACT

A system for dewatering a material comprising a slitter, wherein the slitter receives the material, separates the material into a plurality of clumps, and deposits the plurality of clumps of material substantially evenly on a conveyor belt. The conveyor belt is partially porous to allow water to pass through but preventing material from passing through. The conveyor belt is operable to convey the material from the slitter to a compression zone; the compression zone comprises at least one high pressure press. The compression plates engages the material positioned on the conveyor belt. At least one knife positioned proximate the at least one compression plate operable to remove material from the bottom surface of the at least one compression plate after a compression cycle; and at least one drain positioned under the conveyor belt to carry water removed from the material away from the conveyor belt.

14 Claims, 10 Drawing Sheets

(51) Int. Cl.
   *C02F 1/00*       (2023.01)
   *F26B 15/00*      (2006.01)
   *C02F 11/122*     (2019.01)
   *C02F 11/123*     (2019.01)
   *C02F 11/147*     (2019.01)

(52) U.S. Cl.
   CPC ........... *C02F 11/122* (2013.01); *C02F 11/123* (2013.01); *C02F 11/147* (2019.01); *F26B 2200/18* (2013.01)

(56) References Cited

U.S. PATENT DOCUMENTS

| | | | |
|---|---|---|---|
| 4,174,371 | A | 11/1979 | Bell |
| 4,255,389 | A | 3/1981 | Jung |
| 5,361,708 | A | 11/1994 | Barnes |
| 5,853,590 | A | 12/1998 | Burnham |
| 6,103,191 | A | 8/2000 | Luker |
| 6,243,968 | B1 | 6/2001 | Conrad |
| 7,240,440 | B2 | 7/2007 | Delons |
| 7,434,332 | B2 | 10/2008 | Morton |
| 8,124,401 | B2 | 2/2012 | Dutil |
| 8,202,342 | B2 | 6/2012 | Burnham |
| 8,468,714 | B2 | 6/2013 | Conrad |
| 8,926,791 | B2 | 1/2015 | Hammond |
| 9,751,813 | B2 | 9/2017 | Merrell |
| 10,259,755 | B2 | 4/2019 | Merrell |
| 10,551,060 | B2 | 2/2020 | Berberoglu |
| 2011/0159576 | A1 | 6/2011 | Arnold |
| 2012/0074057 | A1 | 3/2012 | Kovalak |
| 2013/0333236 | A1 | 12/2013 | Grosser |
| 2014/0144195 | A1 | 5/2014 | Callendrello |

FOREIGN PATENT DOCUMENTS

| | | |
|---|---|---|
| CN | 201217645 Y | 4/2009 |
| CN | 201809266 U | 4/2011 |
| CN | 102643007 A | 8/2012 |
| CN | 10276864 A | 11/2012 |
| CN | 202610086 U | 12/2012 |
| CN | 202829795 U | 3/2013 |
| CN | 103359904 A | 10/2013 |
| CN | 104014580 A | 9/2014 |
| DE | 20304220 U1 | 5/2003 |
| DE | 202006008137 U1 | 11/2006 |
| DE | 102011018279 A1 | 10/2012 |
| EP | 2013148 B1 | 12/2011 |
| EP | 1644679 B1 | 4/2012 |
| EP | 1464628 B1 | 10/2012 |
| FR | 2927693 A1 | 8/2009 |
| JP | S591541184 A | 9/1984 |
| KR | 20110100688 A | 9/2011 |
| RU | 2111938 C1 | 5/1998 |
| WO | 2004020922 A1 | 3/2004 |

OTHER PUBLICATIONS

Slim, R., et al., "Modeling of a solar and heat pump sludge drying system," International Journal of Refrigeration; 2008; pp. 1156-1168; vol. 31, Elsevier Ltd. and IIR; France (13 pages).

Salihoglu et al., "Solar drying in sludge management in Turkey," Renewable Energy; 2007; pp. 166i-1675; vol. 32; Elsevier Ltd., Turkey (14 pages).

Romdhana, M. H. et al, "Monitoring of pathogenic microorganisms contamination during heat drying process of sewage sludge," Process Safety and Environmental Protection; 2009; pp. 377-386; vol. 87; Elsevier B.V.; France (10 pages).

Seginer, I. et al, "Modeling Solar Drying Rate of Wastewater Sludge," Drying Technology: An International Journal; 2006; pp. 1353-1363; vol. 24; Taylor & Francis Group, L.LC; Israel (12 pages).

Mathioudakis, V.L Et /-1L, "Extended Dewatering of Sewage Sludge in Solar Drying Plants," Desalination; 2009; pp. 733-739; vol. 248, Elsevier B.V., Greece (7 pages).

Luboschik, U., "Solar Sludge Drying—Based on the IST Process," Renewable Energy: 1999; pp. 785-788; vol. 16; Elsevier Science Ltd.; Germany (14 pages).

Seginer, i. et al, "Optimal Control of Soiar Sludge Dryers," Drying Technology, 2007; pp. 401-415; vol. 25; Taylor & Francis Group, LLC; Israel (16 pages).

Bux, M. et al., "Class-A by Solar Drying Recent Experiences in Europe," Proceedings of the Water Environment Federation, WEFTEC 2001: Sessions 41-50; pp. 309-317; Germany (9 pages).

Lei, Z. et al., "Sewage Sludge Soiar Drying Practise and Characteristics Study," Asia-Pacific Power and Energy Engineenng Conference; 2009; pp. 1-5; IEE Explore; China (5 pages).

Zwiefelhofer, Hans P., "Aerobic-thermophilic/anaerobic-rnesophilic two-stage sewage sludge treatment: Practical experiences in Switzerland," Conservation & Recycling; 1985; pp. 285-301, vol. 8, No. 1/2; Pergamon Press Ltd., Great Britain ( 17 pages).

Hudson, J.A et al., "Current Technologies for Sludge Treatment and Disposal," Water and Environmental Journal; Dec. 1996; pp. 136-441; vol. 10; Wiley; United Kingdom (6 pages).

IDS filed in U.S. Appl. No. 17/720,353, filed Jun. 28, 2022.

Notice of Allowability in U.S. Appl. No. 17/720,353 dated Mar. 26, 2025.

440

SYSTEMS, METHODS, AND APPARATUS FOR MECHANICALLY REMOVING LIQUID FROM MATERIAL

This application claims priority to provisional application Ser. No. 63/285,508 filed on Dec. 3, 2021 titled Systems and Methods for Mechanically Removing Liquid from Material, the entire content of which is incorporated herein by reference.

BACKGROUND OF INVENTION

The disclosed inventions relate to novel systems, apparatuses, and methods to remove liquid from material. In most applications, the material comprises biosolids, e.g., the solid, semi-solid, or liquid residue generated during the biological wastewater treatment process. In other applications, the material comprises organic or inorganic material such as feed additives. The term "material" is used collectively to include biosolids and other organic or inorganic compositions.

The disclosed inventions may operate independently to mechanically dewater material. Alternatively, the disclosed inventions may supplement existing systems or methods used to generate class A fertilizer from biosolids as described in U.S. Pat. Nos. 9,751,813 and 10,259,755 and pending application Ser. No. 17/220,994, all of which are owned by the instant applicant, and the entire disclosures of which are incorporated herein by reference.

SUMMARY OF INVENTION

The disclosed inventions process material (e.g., sludge) that may have been dewatered with a belt press, centrifuge, screw press, or other type of dewatering device. The inventions mechanically compress the material (sludge) to remove water from the material that cannot be extracted through conventional means. Material such as sludge starts out as a liquid and can be dewatered by adding polymer. Adding polymer removes water from the material to increase the percent solids of the material. The dewatered material may then be fed into the double drum dryer to remove additional water to increase the percent solids to a concentration of about 90%.

The disclosed inventions apply high pressure forces to the material. A belt transports material on a woven mesh belt to a compression zone. Hydraulically actuated plates exert high pressure forces on the material to press additional water out of the material. This process increases the solids percentage from 15-25% to about 30-45%. The reduction in water content reduces the volume of material. When used in conjunction with existing systems (e.g., a double drum dryer) the disclosed inventions materially increase the throughput (i.e., the end product) because less water remains in the material before being exposed to a thermal drying system.

The disclosed inventions may also allow liquid sludge to be delivered directly into the system with or without first adding a polymer to the sludge. One of the existing challenges in the industry is to dewater material as much as possible mechanically. Mechanical dewatering includes any system or process that does not use heat or thermal energy; therefore, mechanical dewatering costs less than heat or thermal drying. In one embodiment, a polymer is added to the sludge, the sludge is then processed through a centrifuge, belt press, or screw press. In this embodiment, the cost is about $0.01-$0.02 per gallon to remove a gallon of water from of a material.

Thermal drying costs about $0.10-$0.20 per gallon to remove a gallon of water. The disclosed inventions reduce the cost to about 10% of the cost of thermal systems. Plants, such as municipal wastewater treatment facilities, that have moderate to low disposal costs focus on mechanical dewatering. Larger volume plants that have higher disposal costs and want to achieve a Class A fertilizer end product will use mechanical dewatering and thermal energy dewatering.

In one example for one city in Indiana, the sludge averages 15% solids (85% moisture or water). Using a prototype of the invention disclosed herein, the system was able to achieve 30% solids (70% moisture) at less than $0.01 per gallon. Mechanical dewatering also reduces the volume and weight of material to be transported by about half, thereby providing additional cost savings during transportation.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION AND ILLUSTRATIVE EMBODIMENTS

The following detailed description provides contemplated modes of carrying out embodiments of the invention. The description is not limiting, rather it illustrates the general principles of the inventions.

Most biosolids from wastewater treatment plants comprise a liquid similar in consistency to skim or whole milk. The concentration typically ranges from 1-8% solids (92-99% moisture). Wastewater that is received in a typical wastewater plant will generally consist of a water content and smaller solids content. Typically, 99% of what comes into a wastewater plant is water. This water is usually treated biologically and discharged into a nearby stream or water body. The remaining 1% that consists of solids is separated and treated independently. The remaining solids are dewatered to 15-25% solids meaning the material still has 75-85% moisture in it.

The inventions combine the use of pre-screening, chemical flocculation dewatering, non-chemical dewatering, conditioning, and/or leveling with high pressure compression and filtration to remove water and thereby reduce the volume of material. Material may be screened and dewatered with a centrifuge, belt press, screw press, or similar devices. Optionally, a polymer may be added to the material before dewatering to flock the liquid. The dewatering process thickens the material to approximately 15-30% solids (70-85% moisture) by weight. After this first thickening step, the material can be conveyed into the disclosed system.

The disclosed inventions process the material that has about 75-85% moisture and reduces the moisture content to 55-75%. This dewatering substantially reduces the transportation and disposal cost. When this technology is used in conjunction with other thermal drying processes, it improves the economics and increases throughput by removing additional moisture that does not need to be removed thermally. By reducing the amount of water in the material, thermal dewatering may be avoided or minimized that reduces the effective cost of dewatering the material.

Figure 1:
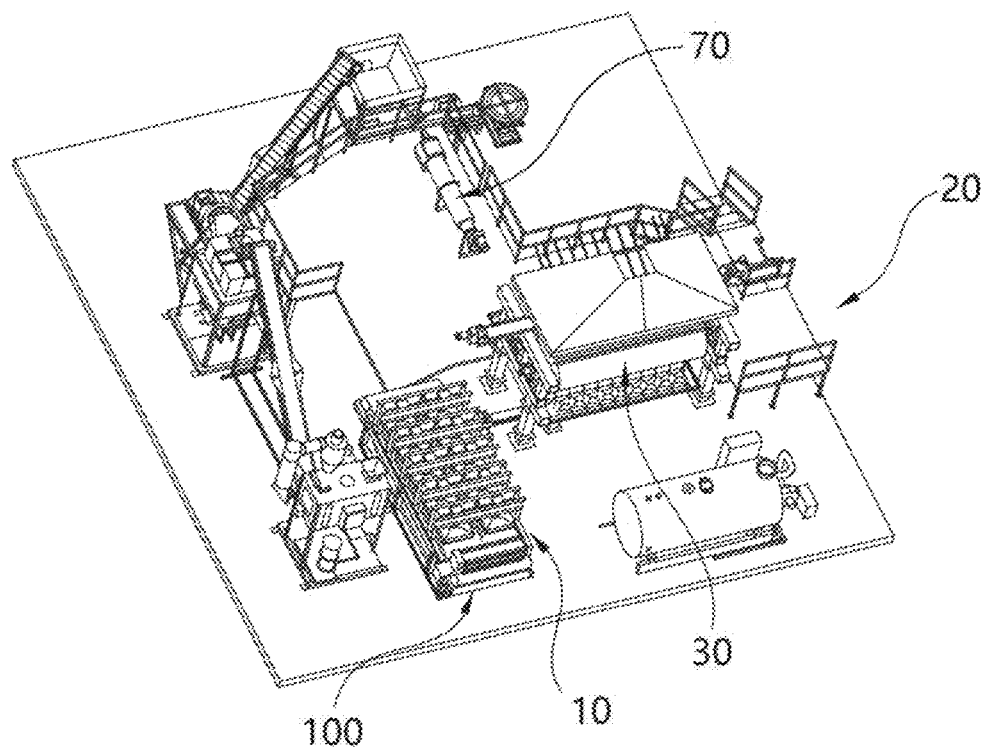
FIG. 1 shows a perspective view of the claimed invention combined with a double drum drying system.

Referring to FIG. 1, the mechanical dewatering apparatus 10 can be combined with existing systems such as a double drum dryer system 20. In one embodiment, the mechanical dewatering apparatus is operably positioned before the double drum dryer.

Figure 2A:
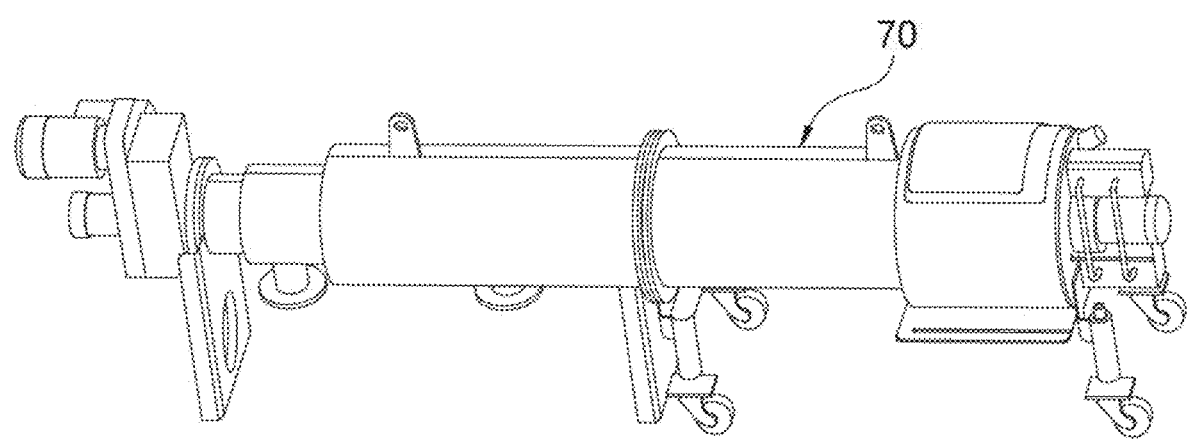
FIG. 2A shows a perspective view of the screen.
Figure 2B:
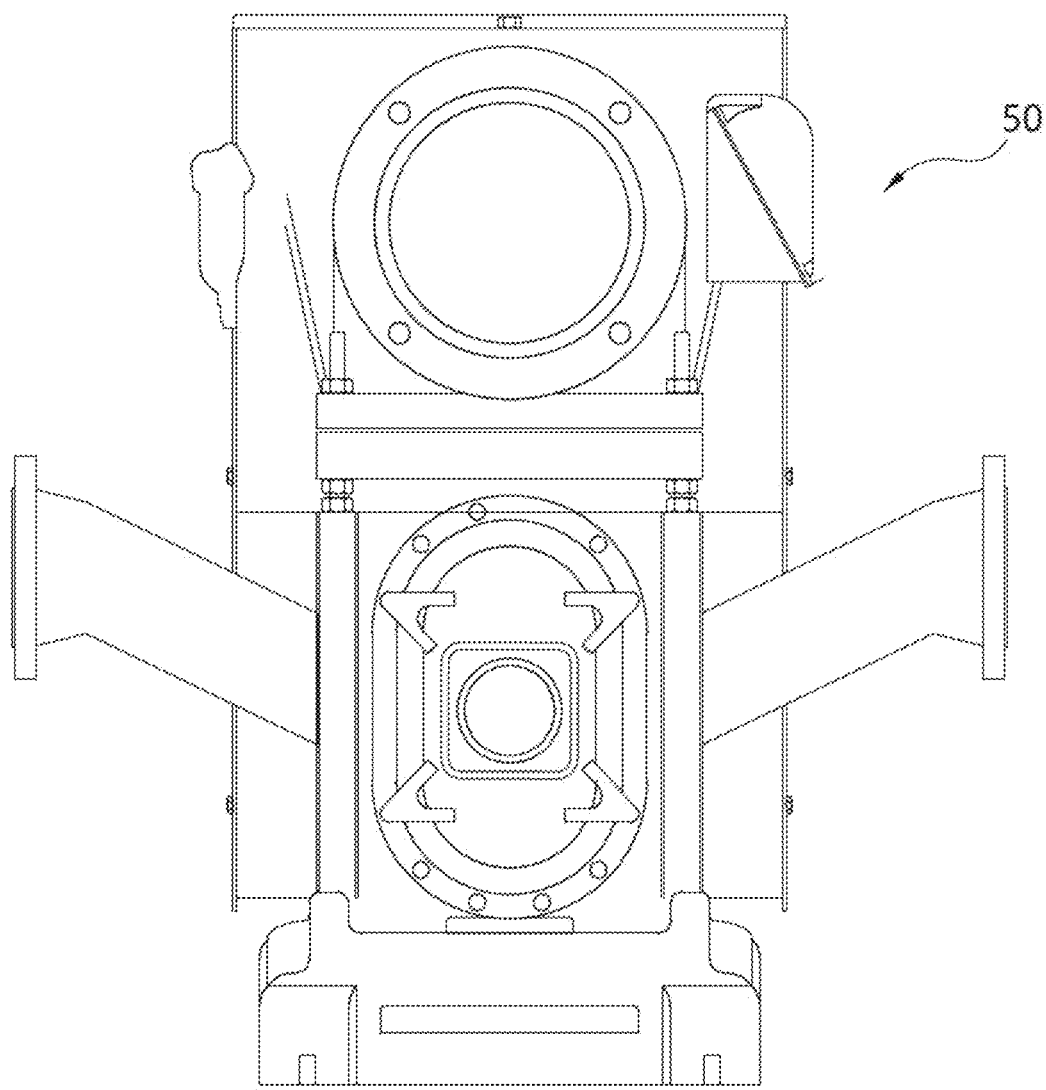
FIG. 2B shows a perspective view of a pump.

Referring to FIGS. 2A and 2B, the process starts by using a pump 50 to convey the material 60 (not shown) through a screen 70. The screen 70 separates from material 60 solids 80 (not shown) larger than about 2-10 mm or any other desired size. The screen 70 is preferably pressurized to move the material 60 through the screen 70. This screening process ensures that no large solids 80 enter the compression chambers 90 that could damage the conveyor belt 100. The solids 80 may be discharged and transported to a landfill. The screened material 60 is then pumped to a centrifuge 110 (FIG. 4), belt press 120 (not shown), or screw press 130 (not shown) as known to a person skilled in the art During the pumping process, one or more polymers 140 (not shown) may be injected into the material 60. The polymer 140 causes the material 60 to "flock". Flocking aids in the separation of the solids 80 from the water in the material 60. In the case of a centrifuge 110, the specific gravity is magnified once the material 60 enters the centrifuge 110 which causes some water to separate from the material 60, and the material 60 exits the centrifuge 110 at about 20-30% solids (70-80% moisture). The centrate 150 (i.e., water extracted from the centrifuge 110), is discharged back into the wastewater plant. The material 60 may then be deposited into the slitter hopper 160 for further dewatering. In one embodiment, the mechanical dewatering apparatus 10 comprises two conveyor belts 100 that operate in parallel. One skilled in the art will realize that any combination of one or more belts 100 may be used without deviating from the claimed inventions.

Figure 3:
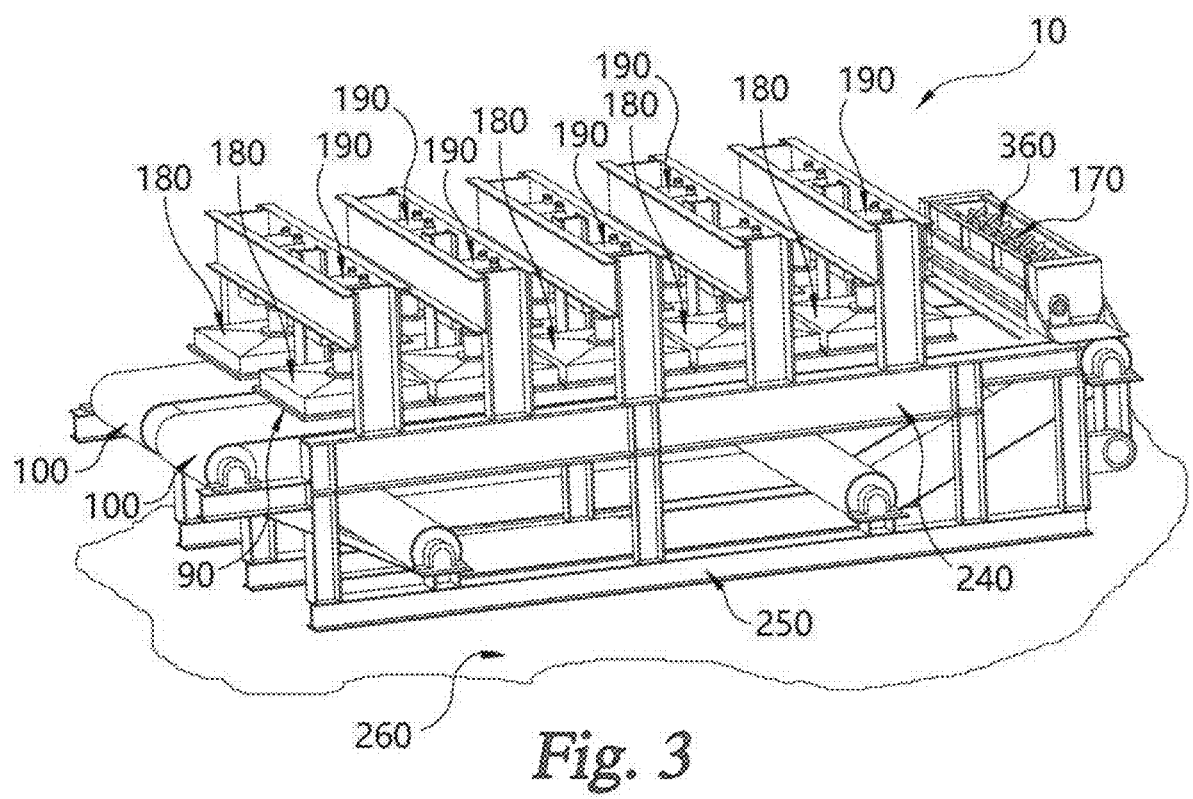
FIG. 3 shows a perspective view of the mechanical dewatering apparatus.
Figure 4:
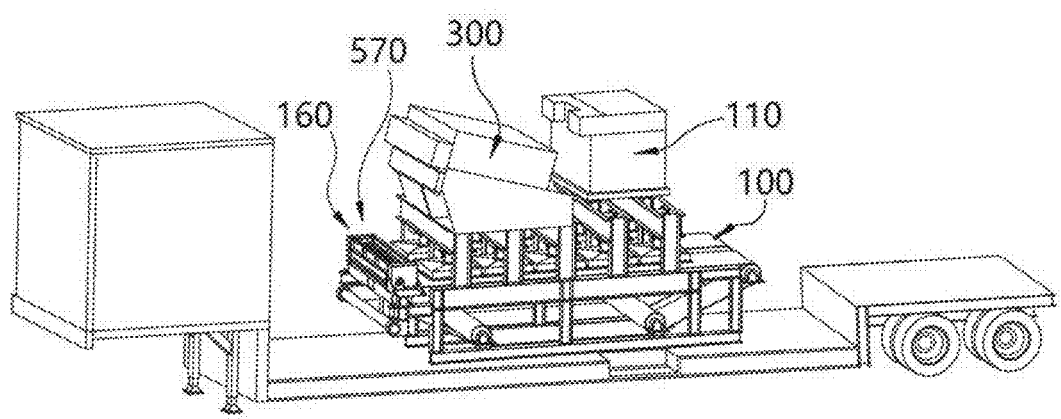
FIG. 4 shows a complete mobile mechanical dewatering apparatus with a screw press option.

Referring to FIGS. 3 and 4, the mechanical dewatering apparatus 10 has a slitter 170, a conveyor belt 100, one or more compression plates 180. Material 60 is delivered to mechanical dewatering apparatus 10 through slitter 170. Slitter 170 delivers material to conveyor belt 100 at predetermined volumes and velocities. The conveyor belt 100 transports material 60 from the slitter 170 and positions material 60 under compression plates 180. Once the material 60 is positioned under plates 180, the conveyor belt 100 stops, and the compression cycle begins.

Figure 5A:
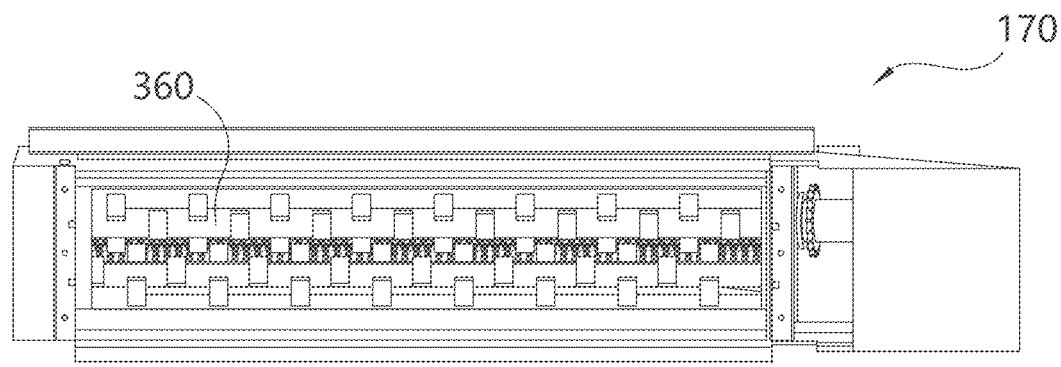
FIG. 5A shows a top view of a slitter box.
Figure 5B:
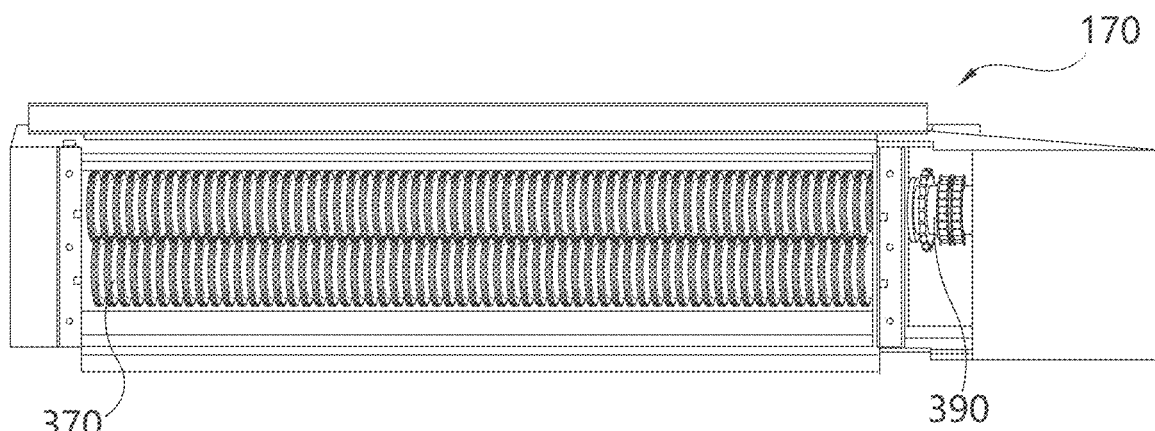
FIG. 5B shows a bottom view of a slitter box.

FIG. 4 shows a mobile mechanical dewatering apparatus 10 that may be moved to different water filtration plants. FIG. 5A shows a top view of slitter 170 into which material 60 is deposited. FIG. 5B shows a bottom view of slitter 170 from which material 60 exits the slitter 170 to be deposited on to conveyor belt 100.

Hydraulic cylinders 190 are operably connected with compression plates 180 to articulate plates 180 toward and away from belt 100. The hydraulic cylinders 190 activate and move the compression plates 180 toward the conveyor belt 100 and onto the material 60 positioned on the conveyor belt 100. In a preferred embodiment, mechanical dewatering apparatus 10 comprises sets of five compression plates 180 serially positioned above each of two conveyor belts 100. Any number of compression plates 180 may be used without departing from the scope of inventions disclosed and claimed.

Figure 7:
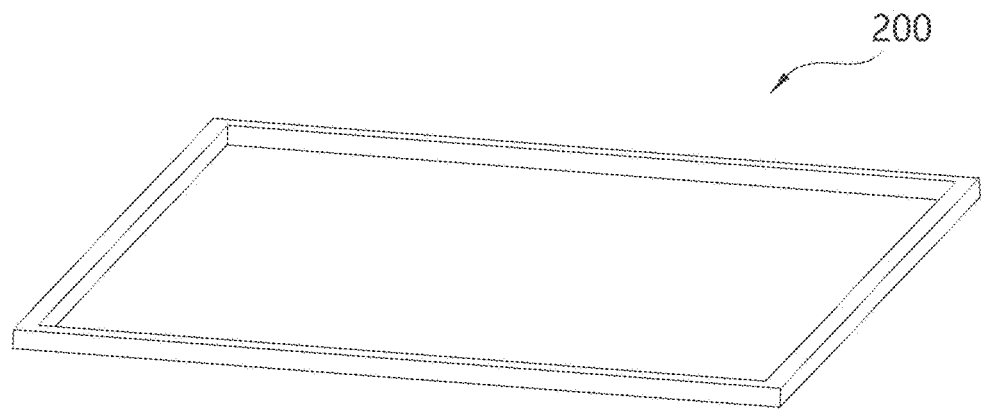
FIG. 7 shows a perspective view of a rubber seal.
Figure 8A:
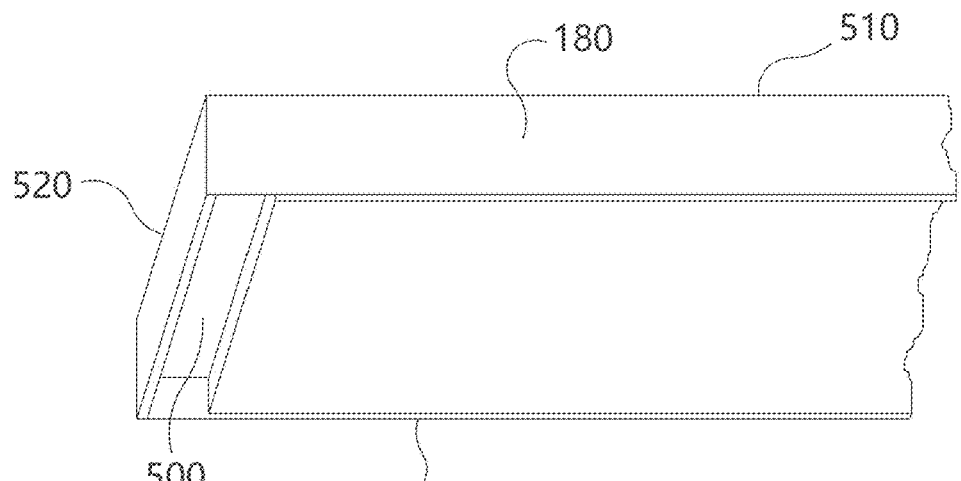
FIG. 8A shows a portion of a compression plate without a seal.

Each compression plate 180 has a seal 200 (FIGS. 7-9) operably attached. The seal 200 may comprise one integral piece or up to four separate pieces forming the four edges of the seal 200. When the cylinders 190 articulate compression plates 180 onto the conveyor belt 100, the rubber seal 200 first contacts the conveying filter belt 100 to retain the material 60 under the compression plates 180 during compression without the material 60 escaping the compression chamber 90. Pressure can be adjusted based on the size or composition of the compression plates 180. In one embodiment, the compression plates 180 are about 30"×30" and about 1" inch thick. The compression plates 180 may be formed of any suitable metal, such as carbon steel, stainless steel, or other alloy. In one embodiment, the compression plates 180 are plated with a material that retards the adhesion of material 60 to compression plates 180. In one embodiment, the compression plates 180 are at least partially chrome plated. As the compression plates 180 move toward belt 100, rubber seal 200 compresses between the compression plates 180 and the belt 100. The rubber seal 200 compresses proportionally at substantially the same rate as the compression plate 180 while maintaining a substantially intact seal. This eliminates or reduces the possibility that the material 60 will extrude out of the compression zone 90 between the compression plate 180 and the conveyor belt 100.

Figure 8B:
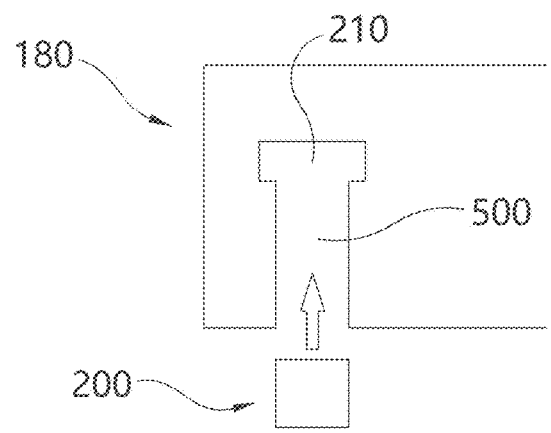
FIG. 8B shows a cross section of the recess in the compression plate that retains the seal.
Figure 9:
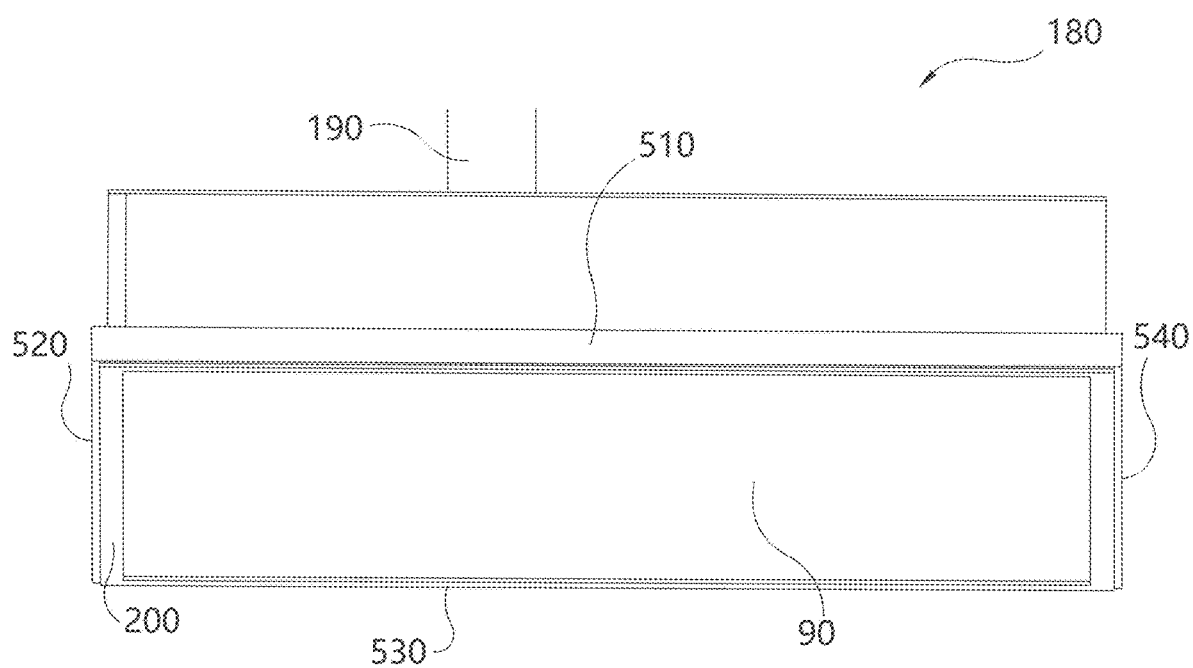
FIG. 9 shows a compression plate with a rubber seal installed.
Figure 10A:
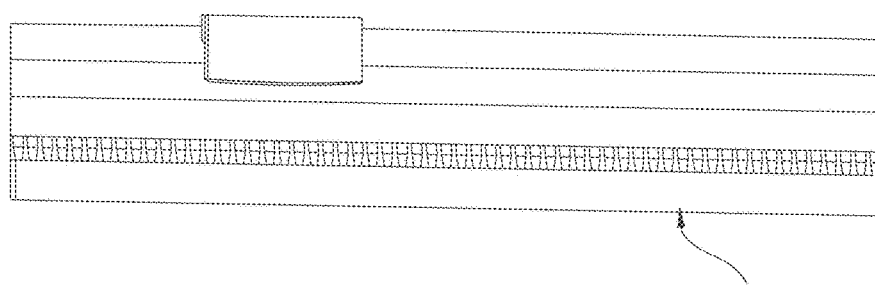
FIG. 10A shows a side view of a wedge wire.
Figure 10B:
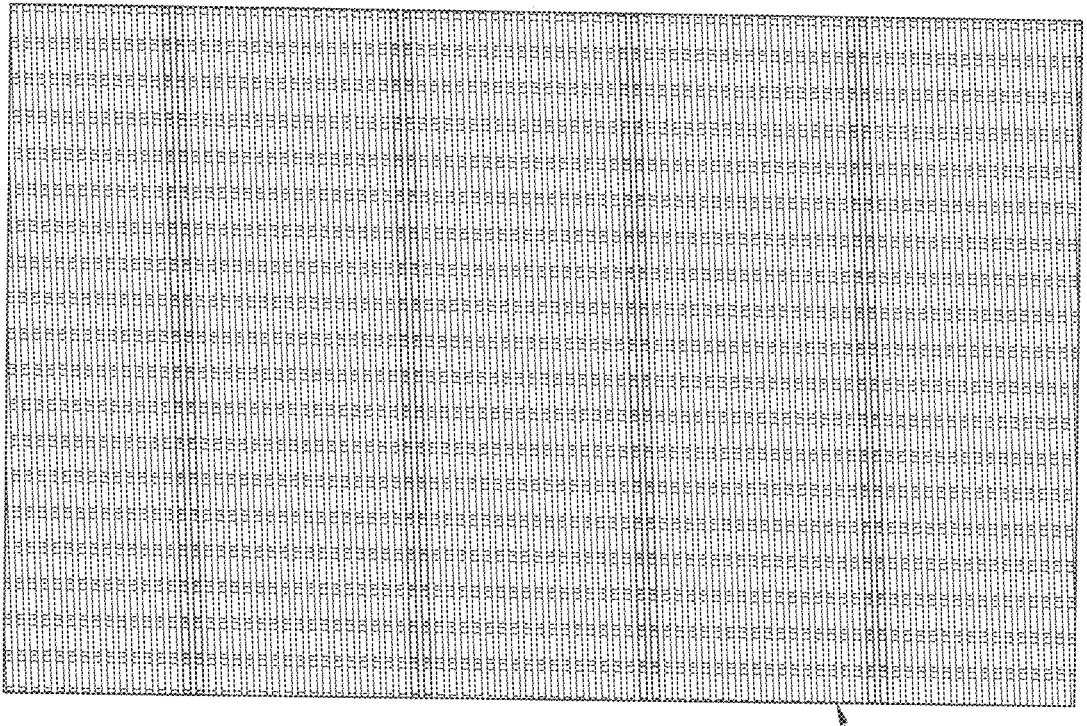
FIG. 10B shows a perspective view of a wedge wire.
Figure 11:
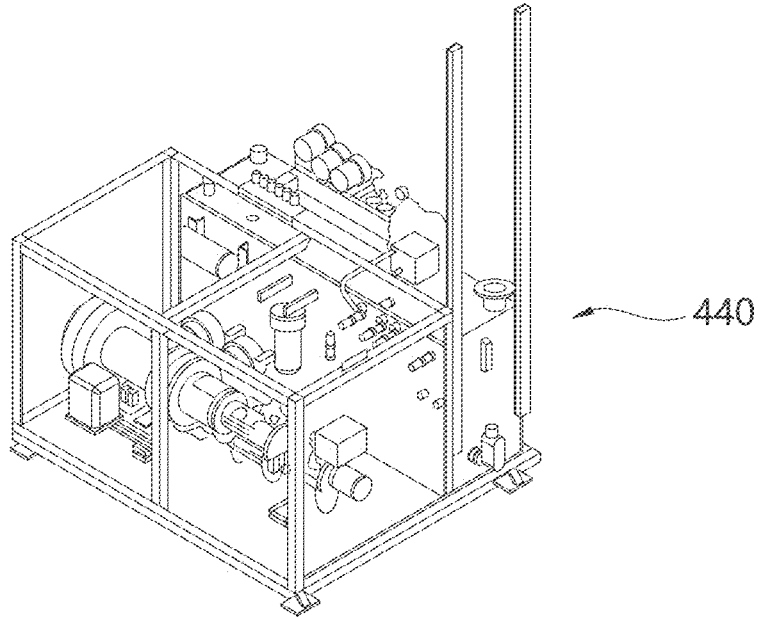
FIG. 11 shows a perspective view of a power unit.

Referring to FIG. 8B, the compression plates 180 have a seal extrusion 210 that removably engages the seal 200. In one embodiment, the seal 200 is press fit into extrusion 210. Extrusion 210 receives seal 200 into the compression plate 180. Extrusion 210 receives the seal 200 inward as the compression plates 180 engages material 60. Seal 200 substantially compresses into extrusion 210 to allow for substantially full compression of the plates 180 against the material 60 without any restriction created by the seal 200. This novel feature allows for substantially higher pressure to be exerted onto the material 60 than allowed by systems known in the art.

Conveyor belt 100 comprises a woven cloth 220 (not shown). Conveyor belt 100 carries the material 60 into position under the compression plates 180 and is supported by a wedge wire 230. The hydraulic cylinders 190 cause the compression plates 180 to impart substantial force onto the material 60 and the conveying belt 100. The wedge wire 230 is exposed to substantial pressure to support the impact and force being applied. Wedge wire 230 is preferably composed of carbon or stainless steel. In a preferred embodiment, the wedge wire 230 has a width of about ¼ inch and a height of about ⁵⁄₁₆ inch. Positioned underneath wedge wire 230 are secondary and tertiary support structures, respectively 240, 250 that bear the weight of the compression until the final force is applied to a floor 260. Secondary and tertiary support structures 240, 250 are preferably comprised of carbon or stainless steel. Floor 260 may be concrete or other suitable composite. The secondary and tertiary support structures 240, 250 may comprise one or more drain pans 270 (not shown) to capture water that has been compressed out of the material 60 through the filter belt 100. The drain pans 270 connect to one or more pipes 280 (not shown) that allow the removed water to flow out of the system 10 for disposal or reuse.

A Programmable Logic Control (PLC) 290 (not shown) controls the compression rate and force. The PLC 290 allows the compression rate and force of the compression plates 180 to be programmed as desired depending on the material 60 being compressed. Multiple operating parameters may be programmed, including without limitation the amount of force exerted on the material 60, the frequency of compression cycles, speed of compression plates 180, speed of belt 100, and others that may be known to a person of ordinary skill in the art.

The cycle time is operator dependent and can be as little as 45 seconds or as long as the operator desires depending on throughput and desired dryness. For example, the longer the cycle time, e.g., the time that the compression plates 180 engage the material 60, more water will be removed, the post-compression material 60 will contain less water, but the volume of material 60 processed over time will be reduced. Preferably, the cycle time for sludge is in the range of about 45 seconds to about 90 seconds.

Figure 6:
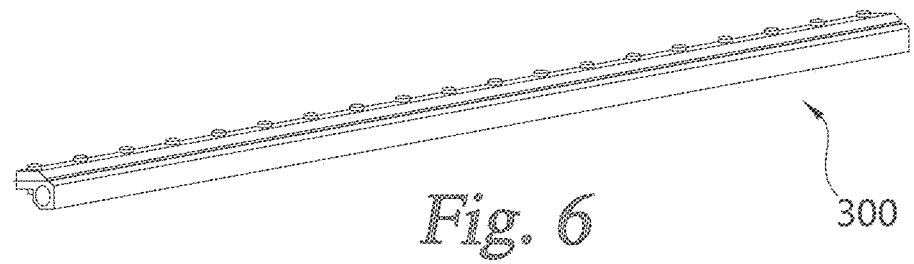
FIG. 6 shows a perspective view of an air knife.

Once the programmed cycle completes, the hydraulic actuators 190 move compression plates 180 away from the material 60 and the conveyor belt 100. The belt 100 may then rotate forward to convey the material 60 out of the compression chamber 90. At or about the same time, one or more knives 300 (FIG. 6) move across the faces 310 of the compression plates 180 removing residual material 60 that may remain on the faces 310. Blades 300 may comprise an air knife or metallic knife. In a preferred embodiment, the air knife provides air pressure of at least 100 psi. The blades 300 may be mounted to a ball screw 330 or similar movement screws proximate the compression plates 180.

The material 60 is then conveyed off belts 100 and deposited into a screw auger 340 or second belt conveyor (not shown) for transport to a truck and/or holding chamber 350 (not shown). After the material 60 is removed from conveyor belt 100, the conveyor belt 100 continues back to the slitter 170 to receive new material 60 to repeat the compression process. The material 60 processed as described above can be reduced in volume by as much as 50-75% depending on the original moisture content and material 60.

Referring to FIGS. 5A and 5B, the slitter hopper 160 comprises a cavity 360 to contain material 60. Slitter 170 contains a plurality of individual discs 370 positioned in cavity 360 so that discs 370 engage material 60 as it passes from slitter 170 to belt 100. In one embodiment, the discs 370 are stacked horizontally relative to the bottom of the slitter 170. The discs 370 are preferably alternated with different diameters depending on the size that the operator desires. In one embodiment, the discs 370 are substantially round with respective diameters of about 4" and 5". The diameter size difference produces a ½"×½" strip of material 60 that exits the slitter 170.

The discs 370 may have apertures 380 positioned and sized to accept shaft 390. In one embodiment, shaft 390 has a substantially hexagonal cross section. The shaft 390 has a first end 400 and a second end 410. The shaft 390 may include threaded portions 420 proximate first and second ends 400, 410. The threaded portions 420 receive a locking nut 430 to be positioned to hold the discs 370 to shaft 390 with a desired distance separating individual discs 370. If the operator desires larger or smaller material 60 strips, the discs 370 may be sized accordingly and the distance between individual discs 370 may be adjusted accordingly as would be recognized by a person of ordinary skill in the art.

The slitter 170 may be controlled by a variable frequency drive (VFD) (not shown) as known in the art. The VFD allows the operator to adjust the rate and/or volume of material 60 discharged out of the slitter 170 to the speed of the belt 100 on to which the material 60 is discharged. The width of the slitter 170 can be varied to the width of the belts 100. The width of the slitter 170 may be adjusted by adding or removing discs 370. Once the material 60 exits the slitter 170, a self-leveling adjustable plate 450 (not shown) positioned proximate belt 100 substantially evenly distributes material 60 across the belt 100. A belt control 460 (not shown) may be used to set and alter the movement of the belt 100 to convey the material 60 from the slitter 170 to the compression chamber 90 underneath the compression plates 180. The belt control 460 may be manually adjusted or controlled by a VFD as would be known to one skilled in the art.

The slitter 170 can be programmed to start and stop as needed to control the volume of material 60 discharged so as to avoid positioning material 60 on the belt 100 corresponding to areas between the compression plates 180 where no compression occurs. These systems can consist of a single, dual, triple, or multiple lines of compression plates 180. In the case of a plurality of lines, a divider 470 (not shown) such as a V blade, may be used to deflect material 60 to a desired belt 100.

Figure 12:
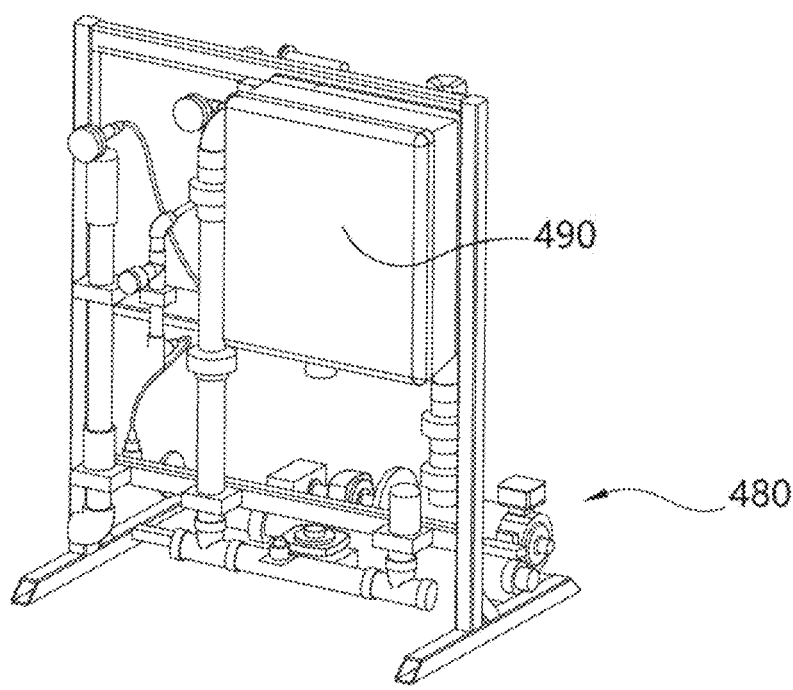
FIG. 12 shows a polymer addition apparatus.
Figure 13:
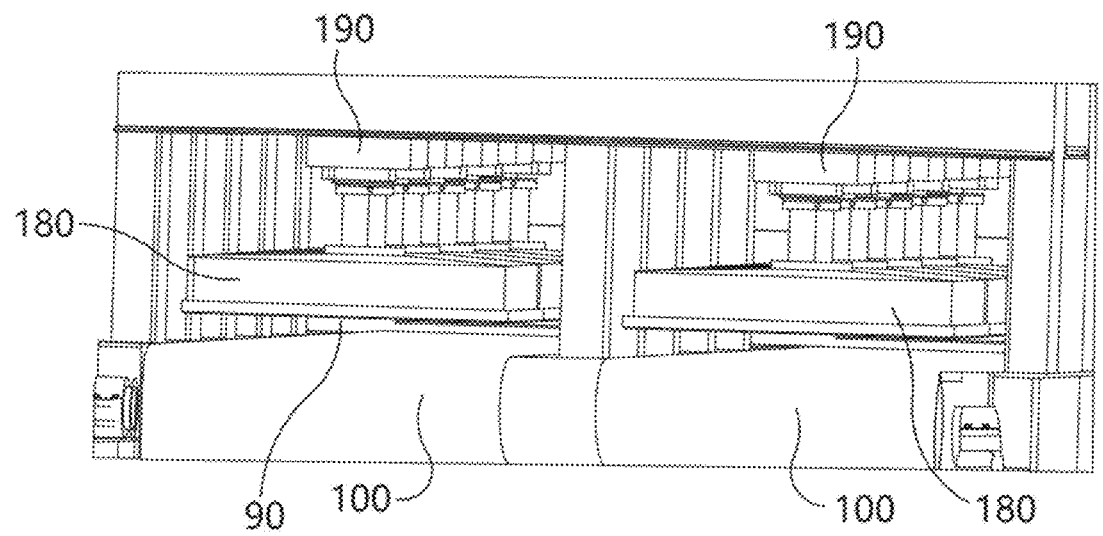
FIG. 13 shows hydraulic cylinders attached to compression plates.
Figure 14:
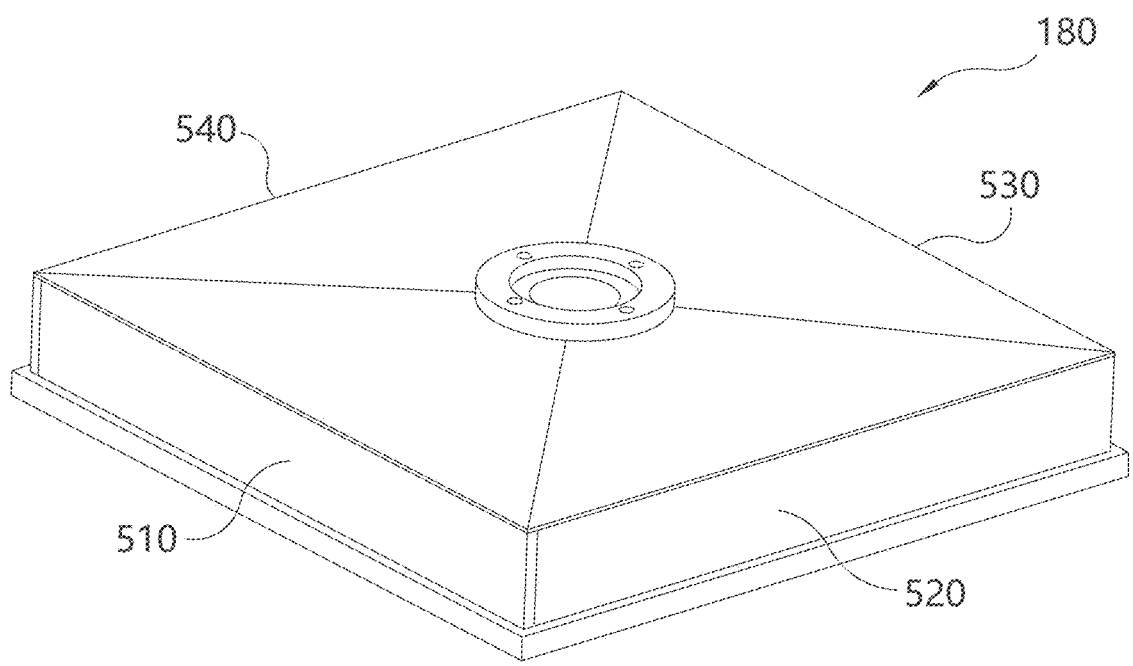
FIG. 14 shows a perspective view of the top compression plate.

Referring to FIGS. 12 and 13, an external hydraulic pump and oil reservoir 440 or an air over hydraulics system can be used to generate the pressure to articulate the compression plates 180. Pressure may be applied up to 15.37 bar (223 psi). An 8" hydraulic cylinder that is powered by a 4,000 psi power unit will generate up to 15.37 bar (223 psi) onto a 30"×30" plate. Larger or smaller hydraulic cylinders 190 can be used depending on the desired pressure.

The seals 200 may be comprised of rubber or other suitable compositions. The compression plates 170 have recesses 500. In preferred embodiments, the recess 500 may be either about ½" or about ¾" wide by ½" or ¾" deep. The recesses 500 extend continuously proximate the four outside edges 510, 520, 530, 540 of the compression plates 180. In one embodiment, the seal 200 comprises Urethane material. The seal 200 has a durometer range from about 40 to about 45. The depth of the recesses 500 on the compression plates 170 allow the seals 200 to retract during the compression cycle. The seals 200 absorb shock and compress into the compression plates 180 while still maintaining a seal around the material 60. As shown in FIG. 8b, the recess 500 has a varying internal width allow seal 200 to expand and be retained by press fit into recess 500.

The seals 200 may comprise a durometer that is strong enough to handle the pressure forces created when the plates 170 compress against the conveyor belt 100 but yet flexible enough to compress inward and recess back up into the extrusion 210. The seals 200 preferably have a memory characteristic to allow them to return to original shape once the compression cycle is finished.

The compression rate and force are adjustable based on parameters set by the operator. The compression cycle may be held for any desired duration and at any desired pressure up to a maximum of about 223 psi. In one embodiment, the compression cycle starts at about 1 psi and increases to about 223 psi over about 60 seconds. A person skilled in the art will appreciate that the amount of force and duration of compression can be varied depending on the material being compressed, the desired water content, the desired volume of throughput or any combination thereof.

Once the compression cycle is complete, the hydraulic cylinders 190 articulate the compression plates 180 away from the conveyor belt 100. In one embodiment, the retraction rate is about 0.25 to 2.0 seconds per inch depending on the operator's throughput variables. The conveyor belt 100 may start to convey forward while moving blades 300, with a minimum air pressure applied against compression plates 180 of about 80 psi, counter to the direction of travel of the belt 100. Alternatively, the blades 300 may move in the same direction as the belt 100 to remove material 60 that may have stuck on the compression plate 180. Alternatively, a pulsating air knife delivery system can be used to reduce the volume of compressed air. The belt 100 continues rotating around and begins the cycle over again at the slitter 170. Depending on the material 60, a high pressure water pump 550 (not shown) and spray bar 560 (not shown) may be used to wash the material 60 off of the belt 100.

During the compression cycle, a hopper 570 positioned above the slitter 170 stores material 60. Once a compression cycle is complete, the hopper 570 deposits material 60 through the slitter 170 onto belt 100 and the compression cycle repeats. This allows the dewatering device (centrifuge, belt press, screw press, etc.) to operate continuously as desired by the volume of material 60 to be dewatered.

Figure 15:
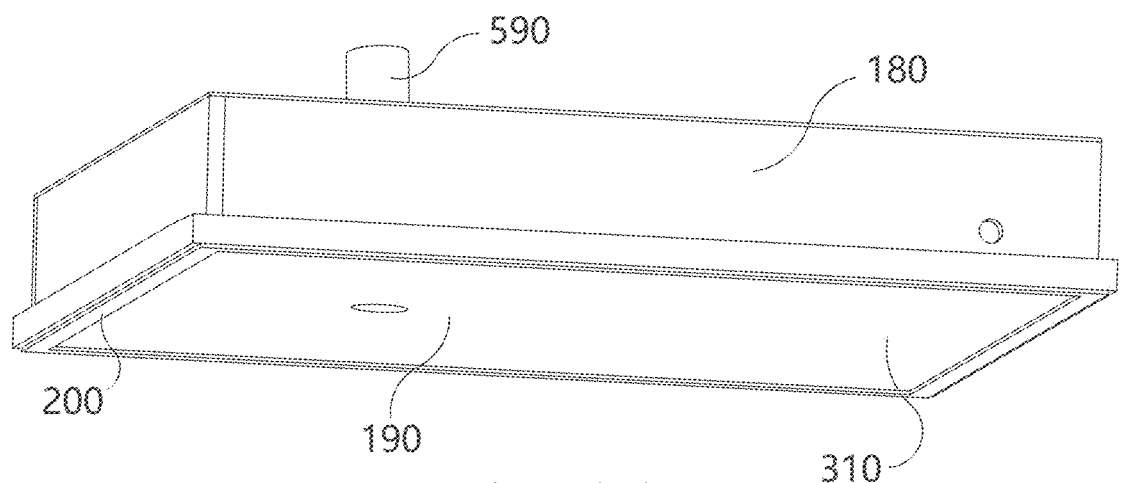
FIG. 15 shows a compression plate comprising a conduit to introduce liquid material.
Figure 16A:
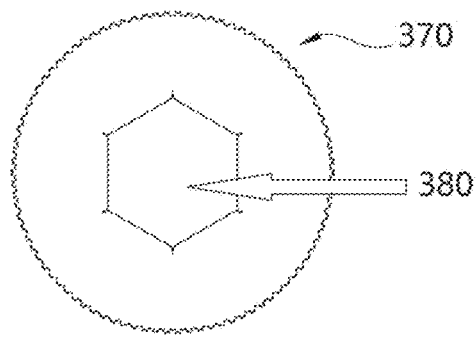
FIG. 16A shows a cross section of a disc from the slitter.
Figure 16B:
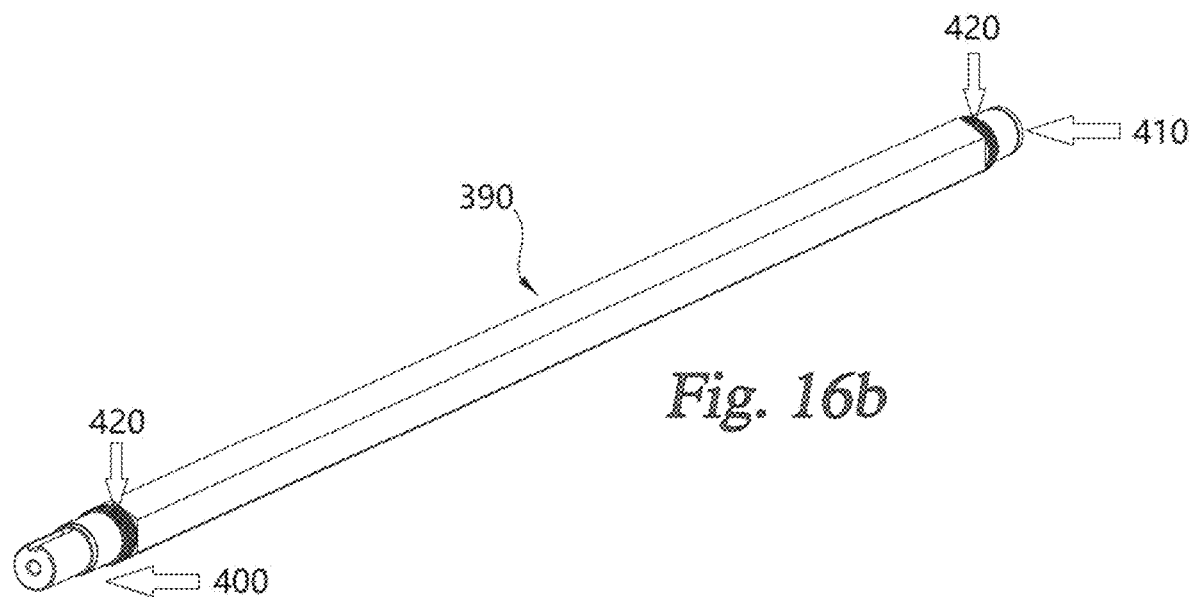
FIG. 16B shows a perspective view of the shaft that holds the discs.
Figure 16C:
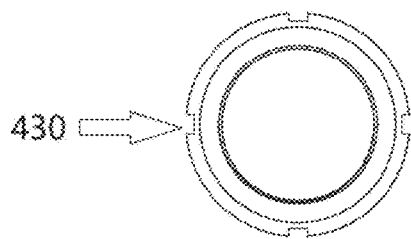
FIG. 16C shows a cross section of a locking nut.

An additional feature of this invention is the ability to provide a one-step dewatering and compression cycle instead of using an optional centrifuge, belt press, screw press, or the like. With this option, the operator may optionally add polymer 580 (not shown) to material 60. If polymer 580 is used, the material 60 throughput will be higher. With this option, the operator may bypass the slitter 170 and pump material 60 into the inlet pipe 590 (FIG. 15) on top of each compression plate 180. The compression plates 180 move so that seals 200 engage belt 100 to form a substantially water tight seal. Liquid material 60 is then pumped into the compression zone 90 between the compression plates 180 and belt 100. The pump 50 injects material 60 and creates the pressure needed to force the water through the belt 100. Pressures up to 223 psi can be used.

Once the compression zone 90 is substantially filled with material 60, the pump 50 is turned off and the compression cycle begins. The compression plates 180 engage material 60 and belt 100 at a predetermined speed to extrude water from material 60. A check valve (not shown) prevents material 60 from backfilling inlet pipe 590. The compression cycles continue based on the predetermined cycle times. When finished, the compression plates 180 retract upward and the belt 100 unloading cycle commences as described above and the cycle repeats. The pressure exerted on the material 60 forces water out of the material 60, through the conveyor belt 100, and into drain pans 270.

The compression plates 180 may exert up to about 223 psi on material 60. A belt press or screw press may exert up to about 10-15 psi. Support steel capable of supporting approximately, 200,000 lbs. of pressure is required to keep the deflection rates to a minimum for each 30"×30" compression plate.

The disclosed inventions my work in conjunction with devices like a double drum dryer or other thermal drying technologies. The disclosed inventions may be adapted to work in conjunction with existing dewatering technologies like a centrifuge, belt press, screw press, and the like. The disclosed inventions may include a screw press 300 positioned above the slitter machine 170 to first dewater the material 60, move the material 60 to the slitter machine 170, and expose the material 60 in the high pressure press 10 making the entire operation a complete replacement for the traditional dewatering machines.

In another embodiment, the material may comprise of animal feed like a product such as Okra. The Okra may be about 10% solids (90% water). Okra may be added to cattle and hog feed for nutrient value. Byproducts such as Okra may be processed using the inventions disclosed herein to arrive at about 30% solids (70% water). Thus, one may dry the byproduct without adding heat that would adversely impact the nutrient value to be added to the cattle feed. Dewatering reduces weight and volume of the material and thereby reduces transportation expenses by about 70%.

I claim:

1. A method for dewatering material comprising the steps of:
   a. delivering a material to a first storage;
   b. transferring the material from the first storage to a slitter, wherein the slitter separates the material into a plurality of clumps;
   c. depositing the plurality of clumps of material from the slitter to a conveyor belt, wherein the conveyor belt is porous to allow water to pass through without allowing solids to pass through;
   d. transporting the plurality of clumps of material on the conveyor belt from the slitter to at least one compression zone, the at least one compression zone comprising at least one high pressure press, the at least one high pressure press comprising at least one hydraulic actuator operably connected to at least one compression plate, wherein the at least one compression plate has a top surface, a bottom surface, and a plurality of side surfaces;
   e. compressing the material by at least one hydraulic compressor to articulate the at least one compression plate toward the material on the conveyor belt and applying a force to compress the material and holding the compression plates against the material and conveyor belt for at least 45 seconds;
   f. retracting the compression plates away from the conveyor belt;
   g. moving the conveyor belt to convey the compressed material away from the at least one compression zone;
   h. applying at least one knife to remove the compressed material from the at least one compression plate after a compression cycle; and
   i. directing water removed from the material away from the conveyor belt using at least one drain.

2. The method of claim 1 wherein the at least one compression plate comprises a substantially square plate having sides about 30 inches long and a thickness of about 1 inch.

3. The method of claim 1 wherein the at least compression plate comprises an alloy.

4. The method of claim 1 wherein the at least one compression plate further comprises an extrusion that engages a seal, wherein the extrusion receives the seal into the at least one compression plate, and the seal substantially compresses into a recess to allow for substantially full compression of the at least one compression plate against the material without any restriction created by the seal.

5. The method of claim 4 wherein the seal comprises an elastic material.

6. The method of claim 1 further comprising the step of supporting the conveyor belt with a wedge wire.

7. The method of claim 1 further comprising a step of controlling the rate of activation of the at least one hydraulic compressor and the force applied by the at least one hydraulic compressor using a programmable logic control.

8. The method of claim 1 further comprising separating the material into a plurality of strips as it exits the slitter using a plurality of discs and then depositing the plurality of strips of material at a substantially even height on the conveyor belt.

9. The method of claim 1 further comprising controlling the volume of material deposited from the slitter to the conveyor belt and the speed of the conveyor belt using a variable frequency drive.

10. The method of claim 9 wherein a programmable logic control selectively activates the variable frequency drive.

11. The method of claim 1 wherein the at least one compression plate exerts a force of less than about 223 pounds per square inch on the material.

12. The method of claim 1 further comprising a step of introducing a polymer to the material before it enters the slitter wherein the polymer causes the material to flock thereby reducing water content from the material before it enters the slitter.

13. The method of claim 1 wherein the material is compressed for about 60 seconds during each compression cycle.

14. The method of claim 1 further comprising a step of distributing the material at substantially even depth across conveyor belt.

* * * * *